Dec. 26, 1961  O. L. CULBERSON ET AL  3,014,778
PRODUCTION OF AN ALUMINUM CHLORIDE-PHOSPHOROUS CHLORIDE COMPLEX
Filed March 20, 1953
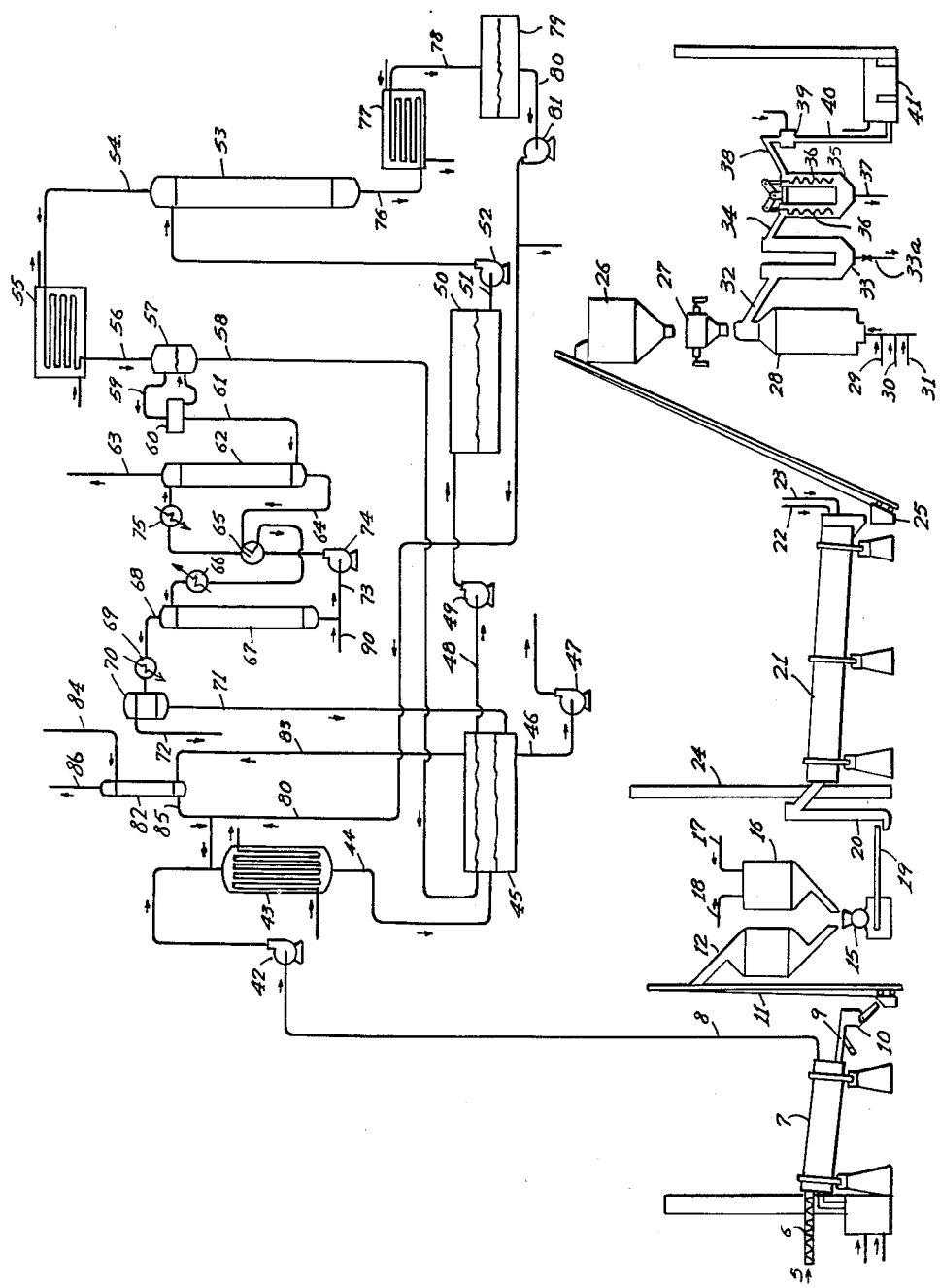
INVENTORS
Oran L. Culberson and
William A. Pardee.
BY
ATTORNEY 3,014,778
PRODUCTION OF AN ALUMINUM CHLORIDE-
PHOSPHOROUS CHLORIDE COMPLEX
Oran L. Culberson, Indiana Township, Allegheny County, and William A. Pardee, Fox Chapel, Pa., assignors to Gulf Research & Development Company, Pittsburgh, Pa., a corporation of Delaware
Filed Mar. 20, 1953, Ser. No. 343,561
8 Claims. (Cl. 23—14)

This invention relates to a process for producing an aluminum chloride-phosphorus chloride complex from an organo-aluminum-phosphorus complex.

Organophosphorus compounds are used as solvents, insecticides, plasticizers, stabilizers, and flameproofing agents. Various methods have been employed to prepare the organophosphorus compounds, but these methods have met with one or more difficulties. One method of preparing an alkane phosphonic acid comprises oxidizing a primary phosphine in the presence of an oxidizing agent such as potassium permanganate, hydrogen peroxide, and fuming nitric acid. This method, however, is hazardous and difficult to control. Hydroxyalkane phosphonic acids have been prepared directly by reacting phosphorous acid and carbonyl compounds. This method, however, requires heating of the reactants for several days on a water bath. Another method for preparing alkane phosphonyl dichlorides and their corresponding acids comprises hydrolysis of an alkyl chloride-aluminum chloride-phosphorus chloride complex. The latter method is satisfactory from the standpoint of product yield and control of the reaction, but it has a disadvantage in that it produces residual material which presents a disposal problem. This residual material comprises essentially a mixture of aluminum chloride hydrates, alkyl dichloro phosphine oxides, organo-aluminum chloride-phosphorus chloride complexes, some aluminum and phosphorus complexes in unknown combined forms, alkyl chlorides, hydrogen chloride, and hydrochloric acid. While the residual material can be rendered substantially innocuous so that it can be dumped or used as fill, the economics of the process do not permit such use.

We have discovered that the residual material obtained upon hydrolysis of an alkyl chloride-aluminum chloride-phosphorus chloride complex and comprising essentially a mixture of aluminum chloride hydrates and complexes of the chlorides of aluminum and phosphorus and organo-aluminum-phosphorus complexes can be converted into a useful product by a process which comprises heating said residual material at a temperature of about 500° to about 1000° F. until substantially all of the material volatile within this temperature range has been removed, calcining the resulting dried product at a temperature of about 1600° to about 1800° F., contacting the calcined product in the presence of coke with a mixture of chlorine and oxygen under reducing conditions at a temperature of about 1600° to about 2000° F. until the aluminum and phosphorus components of the calcined product have been converted into their respective chlorides.

In accordance with the present process the residual material which is obtained during the hydrolysis of an alkyl chloride-aluminum chloride-phosphorus chloride complex is converted into a useful product. The product comprises an aluminum chloride-phosphorus chloride complex which is a useful recirculant to the process for making alkane phosphonyl dichlorides. In converting the residual material to a useful product, it was indeed surprising to find that phosphorus chloride was obtained along with the aluminum chloride. The conditions under which the residual material is treated are such that it would ordinarily be expected that the phosphorus component would be lost by volatilization. However, we have found that there is very little phosphorus lost in converting the residual material to the chlorides of aluminum and phosphorus.

In the preparation of methyl phosphonyl dichloride, a complex between methyl chloride, phosphorus trichloride and aluminum chloride is hydrolyzed at a temperature between about 0° and 40° C. Upon standing at a temperature between about 0° and 5° C., a crystalline product separates from the hydrolysis reaction mass. The crystalline product is separated from the reaction mass by extraction with methylene chloride. Methyl phosphonyl dichloride is recovered from the methylene chloride solution by distilling off the methylene chloride. A similar procedure is employed in the production of isopropyl phosphonyl dichloride and tertiary butyl phosphonyl dichloride. The residual material remaining after extraction of the alkyl phosphonyl chloride is the material with which this invention is concerned. The residual material contains essentially all of the aluminum and about 25 to 30 percent of the phosphorus introduced in the charge complex. Depending upon the completeness of the removal of the extractant, the residual material may comprise about 20 to 30 percent by weight of solvent, such as, for example, methylene chloride. The methylene chloride, water and other volatiles such as hydrogen chloride are first removed by heating the residual material to about 500° to about 1000° F. The methylene chloride and hydrogen chloride are advantageously recovered for further use. The residual material having been freed of the more volatile constituents is then heated to a calcining temperature of about 1600° to about 1800° F. The calcined product comprises about 10 to 20 percent of the original residual material and contains about 40 percent aluminum, 10 percent phosphorus and 50 percent oxygen.

The calcined product is then chlorinated in the presence of coke by a stream consisting of about three volumes of chlorine to one volume of oxygen. The amount of coke comprises at least one part by weight of coke to five parts by weight of residual material. Excess coke may be employed if desired. We have found that equal parts by weight of coke and residual material give good conversion of the residual material to the chlorides of phosphorus and aluminum. Chlorination is advantageously carried out at a temperature of about 1600° to about 2000° F. The chlorinated product comprising an aluminum chloride-phosphorus chloride complex is vaporized from the reaction zone and then recovered by condensation. Chlorination can also be accomplished by using hydrogen chloride as the chlorinating agent. Conversion of the aluminum and phosphorus components to their respective chlorides is not as complete as when a chlorine-oxygen stream is used. For instance, we have found that a bauxite having been calcined at about 1600° F. and then mixed with about equal parts by weight of coke and treated with hydrogen chloride at about 2300° F. gives an overall conversion of only 53 percent. When a chlorine-oxygen stream was used at about 2000° F., the conversion was about 97 percent.

According to a preferred embodiment of the invention, the hydrogen chloride recovered in the system is converted into chlorine by a modified Deacon process. The chlorine thus obtained is then used to chlorinate the calcined material. According to this procedure, hydrogen chloride is converted in the presence of oxygen to chlorine and water. By employing a controlled excess of oxygen, the product of the modified Deacon process after being dried comprises chlorine and oxygen in the ratio desired for chlorination. Since the process herein defined advantageously employs a chlorine-oxygen stream for chlorination, the problem normally operating as a disadvantage in producing chlorine free from oxygen is no longer a disadvantage but instead is an advantage. Therefore, in accordance with a preferred embodiment of the invention, the hydrogen chloride recovered as a by-product is converted into a chlorine-oxygen stream for use in the chlorination of calcined residual material. The molecular ratio of free chlorine to free oxygen in the chlorine-oxygen stream thus obtained is about 3 to 1. The reaction taking place in the modified Deacon process may be illustrated by the following equation:

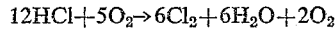

$$12HCl + 5O_2 \rightarrow 6Cl_2 + 6H_2O + 2O_2$$

A further method of chlorination comprises the use of a chlorine-carbon monoxide stream. At 1600° F. a chlorine-carbon monoxide stream is about equivalent to the chlorine-oxygen-coke system. Phosgene is equally suitable as the chlorinating agent.

The ratio of the aluminum chloride and the phosphorus chloride in the complex can be varied by adding either bauxite or an acid of phosphorus such as phosphoric or phosphorus acid to the residual material. Since the phosphorus component is partially consumed in forming the alkane phosphonyl dichloride, it is generally desirable to add either phosphoric or phosphorous acid to the residual material prior to the drying step. These acids are preferably added in amounts such that the weight ratio of aluminum to phosphorus in the aluminum chloride-phosphorus chloride complex will be about 1:1. A further method of adjusting the ratio of aluminum chloride and phosphorus chloride in the complex comprises adding phosphorus trichloride to the complex.

The coke employed during the chlorination of the calcined product is advantageously petroleum coke. However, wood charcoal can also be used. The coke serves several useful purposes. One is that it supplies the heat required to carry out the chlorination. Another is that it serves as a reducing agent.

In order that the invention may be understood more fully, reference should be had to the attached drawing which is a diagrammatic illustration of the process of the invention.

Now referring to the drawing, the process will be described in connection with a residual material obtained from the manufacture of methyl phosphonyl dichloride. It should be understood, of course, that the process is applicable to all residual materials of this type whether the organo phosphonyl dichloride prepared is the methyl, ethyl, propyl, isopropyl, butyl, isobutyl, sec-butyl, tert-butyl, or other organo phosphonyl dichloride.

Residual material comprising essentially a mixture of aluminum chloride hexahydrate, organo-aluminum chloride-phosphorus chloride complexes, methylene chloride, hydrogen chloride, and water obtained from the hydrolysis of a methyl chloride-aluminum chloride-phosphorus chloride complex in a system not shown is introduced at 5 by a conveyor 6 into a drier 7. The methylene chloride comprises about 20 to 30 percent by weight of the residual material introduced at 5. This methylene chloride in the residual material results in part from its being used as a solvent to remove methyl phosphonyl dichloride from the reaction mass obtained upon hydrolysis of the methyl chloride-aluminum chloride-phosphorus chloride complex. The nature of the residual material introduced into drier 7 is such that the conveyor 6 is advantageously of the ribbon type. The volatile material removed in drier 7 is advantageously recovered; therefore drier 7 is advantageously an indirect heated rotary drier constructed of corrosion-resistant material such as a nickel-clad steel. The residual material in drier 7 is heated to a temperature of about 500° to about 1000° F. The volatile material consisting essentially of methylene chloride, hydrogen chloride, and water is removed to a recovery system by conduit 8. The dried residual material is removed from drier 7 by a vibrating conveyor 9 and collected in a hopper 10. From hopper 10 the dried residual material is conveyed by a skip hoist 11 to a storage hopper 12. From storage hopper 12 the dried residual material is fed to a hammer mill 15 where it is admixed and ground with coke which has been introduced into the hammer mill 15 from a hopper 16. Coke is introduced into hopper 16 by conduit 17. When it is desired to increase the ratio of aluminum chloride in the aluminum chloride-phosphorus chloride complex recovered as hereinafter described, bauxite may also be introduced into hopper 16 by conduit 18. From hammer mill 15 the mixture of dried residual material and coke is fed by a belt conveyor 19 to a bucket elevator 20 which discharges the dried material into a rotary kiln 21. Rotary kiln 21 is fired by natural gas and air introduced into the kiln by conduits 22 and 23, respectively. In rotary kiln 21 the residual material is heated to a calcining temperature of about 1600° to about 1800° F. Waste gases are removed through stack 24. A calcined product is removed from kiln 21 to a skip hoist 25 which conveys the calcined product to a storage hopper 26. From storage hopper 26 the calcined product is passed to a feed hopper 27 which discharges the calcined product into a retort 28. In retort 28 the calcined product is chlorinated by the introduction of chlorine, oxygen, and compressed air by conduits 29, 30, and 31, respectively. Chlorination in retort 28 is advantageously carried out at a temperature of about 1600° to about 2000° F. Operation of the retort consists in passing a continuous stream of about 75 percent by volume chlorine and 25 percent by volume oxygen at a pressure of about 5 pounds per square inch gauge through the calcined mixture. When chlorine appears in the retort effluent, an additional quantity of calcined product is introduced from feed hopper 27 into retort 28. Air is introduced periodically along with the chlorine and oxygen in order to minimize hot-spot formation in the retort. Effluent from retort 28 at about 1600° to about 2000° F. is introduced by a conduit 32 into the U-shaped brick-lined atmospheric cooler 33. In cooler 33 the gas temperature is reduced to about 500° F. and any coke or unreacted calcined product entrained in the gases drops out and can be removed by conduit 33a. The gases leaving cooler 33 are passed by a conduit 34 to a U-shaped condenser 35. U-shaped condenser 35 consists of two steel tubes having jackets through which cooling water flows. On the inside of each tube is a scraper 36 which removes the product comprising an aluminum chloride-phosphorus chloride complex. The complex may be removed either periodically or continuously by conduit 37. Uncondensed gases at a temperature of about 110° F. which leave condenser 35 by conduit 38 are scrubbed with water in scrubber 39 and then passed by conduit 40 to furnace 41 where the gases are burned.

Volatiles at a temperature of about 600° F. which are removed from drier 7 by conduit 8 are introduced by a centrifugal exhauster 42 into a condenser 43. In condenser 43 methylene chloride, water, and hydrogen chloride are condensed and removed by conduit 44 to a separator 45. Methylene chloride is removed from the bottom of separator 45 by conduit 46 and passed by pump 47 to storage, not shown. A hydrochloric acid layer comprising about 36 percent acid is removed from separator 45 by conduit 48 and pump 49 to a surge tank 50. The 36 percent acid is removed from the bottom of surge tank 50 by conduit 51 and introduced by pump 52 into the top of a stripper 53. In stripper 53 hydrogen chloride and water in a concentration comprising about 43 percent acid together with a small amount of methylene chloride are removed by conduit 54 to a cooler 55. In cooler 55 the vapors are cooled to about 90° F. and then passed via conduit 56 to a separator 57. From separator 57 a hydrochloric acid stream comprising essentially 43 percent acid is removed by conduit 58 and returned to separator 45. The vaporous product from separator 57 is passed by conduit 59 to a mist trap 60. From mist trap 60 a hydrogen chloride-rich gas is passed by conduit 61 to an absorber 62. From the top of the absorber 62 to a substantially anhydrous hydrogen chloride-rich gas is removed by conduit 63 to storage, not shown. This gas is suitable for the preparation of chlorine by a modified Deacon process (not shown) which can be used as the chlorinating agent in retort 28. From the bottom of absorber 62 a stream comprising absorber oil and methylene chloride together with a small amount of hydrogen chloride is passed by conduit 64 through a heat exchanger 65 and a heater 66 to stripper 67. In stripper 67 an overhead product comprising water and methylene chloride is removed via conduit 68 through a cooler 69 to a separator 70. In separator 70, methylene chloride settles to the bottom and is removed by conduit 71 to separator 45. A stream comprising water is removed from separator 70 by conduit 72. From the bottom of stripper 67 lean absorber oil is removed by conduit 73 and reintroduced by pump 74 after passing through heat exchanger 65 and cooler 75 into the top of absorber 62. Fresh absorber oil may be added to the system, as needed, by conduit 90.

From the bottom of stripper 53 dilute hydrochloric acid comprising about 20 percent acid is removed by conduit 76 to a cooler 77. In cooler 77, 20 percent acid is passed by conduit 78 to a storage tank 79. From storage tank 79, 20 percent acid is removed by conduit 80 and introduced by a pump 81 into condenser 43. Also introduced into the condenser 43 is a hydrochloric acid stream which has been obtained in a scrubber 82. The acid obtained in scrubber 82 comprises that obtained by scrubbing the vaporous product from separator 45. The vaporous product from separator 45 is introduced into the scrubber by conduit 83. As the vapors pass up through the scrubber 82 they contact water, which is introduced by conduit 84. The water removes any hydrogen chloride present and is removed from the bottom of scrubber 82 by conduit 85 to conduit 80 where it is admixed with 20 percent acid coming from storage tank 79. Inert gases are removed from the top of scrubber 82 by conduit 86.

The following specific example will illustrate the production of an aluminum chloride-phosphorus chloride complex from a residual material obtained after removal of methyl phosphonyl dichloride from the reaction mass obtained upon hydrolysis of the methyl chloride-aluminum chloride-phosphorus chloride complex. In this example the residual material was heated slowly to about 1000° F. The total amount of volatiles driven off comprising methylene chloride, hydrogen chloride, and water was about 80 percent by weight of the residual material. The dried product was then broken to pass through a 10-mesh screen. This material was then calcined in air at about 1600° F. for one hour. The weight ratio of aluminum to phosphorus in the calcined residual material was about 4:1. 72 grams of calcined residual material was then mixed with 72 grams of calcined coke and charged to a reactor comprising a Vitreosil tube. The Vitreosil tube was placed in a furnace so that only the uppermost and lowermost parts of the tube protruded from the furnace. The upper portion of the tube and the transfer line to the condenser were electrically heated by wire winding to prevent condensation of aluminum chloride or phosphorus chloride therein.

The temperature of the reactor was gradually raised from about 1600° to about 2000° F. A stream consisting of three volumes of chlorine and one volume of oxygen was then passed through the calcined residual material. The effluent from the reactor passed to a vertical air-cooled condenser and then into a further condenser maintained at about −21° C. From this condenser the vapors passed through a second vertical condenser similar to the first and then into a trap containing water through which the vapors were bubbled to remove the last traces of product in the stream. After about three and one-half hours of adding chlorine and oxygen, it was observed that chlorine was present in the effluent from the reactor. An additional quantity of calcined residual material (25 grams) and coke (9.25 grams) was then added to the top of the reactor without interruption of the gas flow. The chlorine did not again break through for about one and one-fourth hours. After the addition of another similar charge, chlorine was noted in the exhaust gas after about one hour. Two more such charges were added and when chlorine broke through after the fourth such charge, the chlorine-oxygen flow was discontinued, and nitrogen flow was commenced. The heat was turned off, and the system was allowed to cool overnight. The reactor was then removed from the furnace. The depth of the bed in the reactor was about five inches as compared with twenty-five inches at the start. The material in the bed consisted of about 9.6 grams of calcined residual material and 18 grams of coke. The aluminum-to-phosphorus weight ratio in the 9.6 grams of calcined residual material remaining in the reactor was about 1:1. Analysis of the condensed product showed that it was a complex consisting of about 18.0 percent aluminum, 2.5 percent phosphorous, and 79.0 percent chlorine. Phosphorous trichloride was added to the condensed product to obtain an aluminum phosphorus ratio of about 1:1. This material was then used to prepare a complex of methyl chloride, aluminum chloride and phosphorus chloride. Hydrolysis of the complex gave a yield of methyl phosphonyl dichloride comparable to the yield obtained when starting with chemically pure reagents.

While our invention has been described above with reference to various specific examples and embodiments, it will be understood that the invention is not limited to such examples and embodiments and may be variously practiced within the scope of the appended claims.

We claim:

1. A process for producing an aluminum chloride-phosphorus chloride complex from a residual material obtained upon hydrolysis of an alkyl chloride-aluminum chloride-phosphorus chloride complex which comprises heating said residual material at a temperature of about 500° to about 1000° F. to remove the more volatile constitutents, calcining the resulting dried solid product at a temperature of about 1600° to about 1800° F., contacting the calcined product with a chlorinating agent under reducing conditions at a temperature of about 1600° to about 2000° F. until the aluminum and phosphorus components of the calcined product have been converted into their respective chlorides, and condensing and recovering from the vaporous chlorinated product an aluminum chloride-phosphorus chloride complex.

2. A process for producing an aluminum chloride-phosphorous chloride complex from a residual material obtained upon hydrolysis of an alkyl chloride-aluminum chloride-phosphorus chloride complex which comprises heating said residual material at a temperature of about 500° to about 1000° F. to remove the more volatile constitutents, calcining the resulting dried solid product at a temperature of about 1600° to about 1800° F., contacting the calcined product with a chlorinating agent comprising a mixture of chlorine, oxygen and coke at a temperature of about 1600° to about 2000° F. until the aluminum and phosphorus components of the calcined product have been converted into their respective chlorides, and condensing and recovering from the vaporous chlorinated product an aluminum chloride-phosphorus chloride complex.

3. A process for producing an aluminum chloride-phosphorus chloride complex from a residual material obtained upon hydrolysis of an alkyl chloride-aluminum chloride-phosphorus chloride complex which comprises heating said residual material at a temperature of about 500° to about 1000° F. to remove the more volatile constitutents, admixing the resulting dried solid product with coke, calcining the resulting mixture of coke and dried solid product at a temperature of about 1600° to about 1800° F., contacting the calcined product with a chlorinating agent at a temperature of about 1600° to about 2000° F. until the aluminum and phosphorus components of the calcined product have been converted into their respective chlorides, and condensing and recovering from the vaporous chlorinated product an aluminum chloride-phosphorus chloride complex.

4. A process for producing an aluminum chloride-phosphorus chloride complex from a residual material obtained upon hydrolysis of an alkyl chloride-aluminum chloride-phosphorus chloride complex which comprises heating said residual material at a temperature of about 500° to about 1000° F. to remove the more volatile constituents, admixing the resulting dried solid product with about an equal weight of coke, calcining the resulting mixture of coke and dried solid product at a temperature of about 1600° to about 1800° F., contacting the calcined product with a chlorinating agent comprising a mixture consisting of about 3 mols of chlorine and one mol of oxygen at a temperature of about 1600° to about 2000° F. until the aluminum and phosphorus components of the calcined product have been converted into their respective chlorides, and condensing and recovering from the vaporous chlorinated product an aluminum chloride-phosphorus chloride complex.

5. A process for producing an aluminum chloride-phosphorus chloride complex from a residual material obtained upon hydrolysis of an alkyl chloride-aluminum chloride-phosphorus chloride complex which comprises adding an acid of phosphorus to said residual material in an amount such that the molecular ratio of aluminum to phosphorus is about 1:1, heating said residual material to which an acid of phosphorus has been added at a temperature of about 500° to about 1000° F. to remove the more volatile constituents, calcining the resulting dried solid product at a temperature of about 1600° to about 1800° F., contacting the calcined product with a chlorinating agent under reducing conditions at a temperature of about 1600° to about 2000° F. until the aluminum and phosphorus components of the calcined product have been converted into their respective chlorides, and condensing and recovering from the vaporous chlorinated product an aluminum chloride-phosphorus chloride complex.

6. A process for producing an aluminum chloride-phosphorus chloride complex from a residual material obtained upon hydrolysis of an alkyl chloride-aluminum chloride-phosphorus chloride complex which comprises adding an acid of phosphorus to said residual material in an amount such that there is at least one mol of phosphorus per mol of aluminum present, heating said residual material to which an acid of phosphorus has been added at a temperature of about 500° to about 1000° F. to remove the more volatile constituents, calcining the resulting dried solid product at a temperature of about 1600° to about 1800° F., contacting the calcined product with a chlorinating agent under reducing conditions at a temperature of about 1600° to about 2000° F. until the aluminum and phosphorus components of the calcined product have been converted into their respective chlorides, and condensing and recovering from the vaporous chlorinated product an aluminum chloride-phosphorus chloride complex.

7. A process for producing an aluminum chloride-phosphorus chloride complex from a residual material obtained upon hydrolysis of an alkyl chloride-phosphorus chloride complex which comprises heating said residual material at a temperature of about 500° to about 1000° F. to remove the more volatile constituents, separating from said more volatile constituents hydrogen chloride, converting said hydrogen chloride to chlorine and oxygen such that the molecular ratio of free chlorine to free oxygen in the resulting product is about 3:1, adding about equal parts by weight of coke to the solid product from which the more volatile constituents have been removed, calcining the mixture of coke and devolatilized solid product at a temperature of about 1600° to about 1800° F., containing the calcined product with a chlorinating agent comprising chlorine and oxygen obtained as above at a temperature of about 1600° to about 2000° F. until the aluminum and phosphorus components of the calcined product have been converted into their respective chlorides, and thereafter condensing and recovering from the vaporous chlorinated product an aluminum chloride-phosphorus chloride complex.

8. A process for producing an aluminum chloride-phosphorus chloride complex from a residual material obtained upon hydrolysis of a methyl chloride-aluminum chloride-phosphorus chloride complex which comprises heating said residual material at a temperature of about 1000° F. to remove the more volatile constituents, calcining the resulting dried solid product at a temperature of about 1600° F., admixing about equal parts by weight of said calcined product with calcined coke, contacting the mixture of calcined product and calcined coke with a chlorinating agent comprising a mixture consisting of about 3 mols of chlorine per mol of oxygen at a temperature of about 2000° F. until the aluminum and phosphorus components of the calcined product have been converted into their respective chlorides, condensing from the vaporous chlorinated product an aluminum chloride-phosphorus chloride complex and adding to said condensed product phosphorus chloride in an amount such that the molecular ratio of aluminum to phosphorus in the end product is about 1:1.

No references cited.